P. L. SCHUYLER AND C. M. SNOW.
AUTOMOBILE ELEVATOR.
APPLICATION FILED DEC. 20, 1920.
1,424,186.
Patented Aug. 1, 1922.
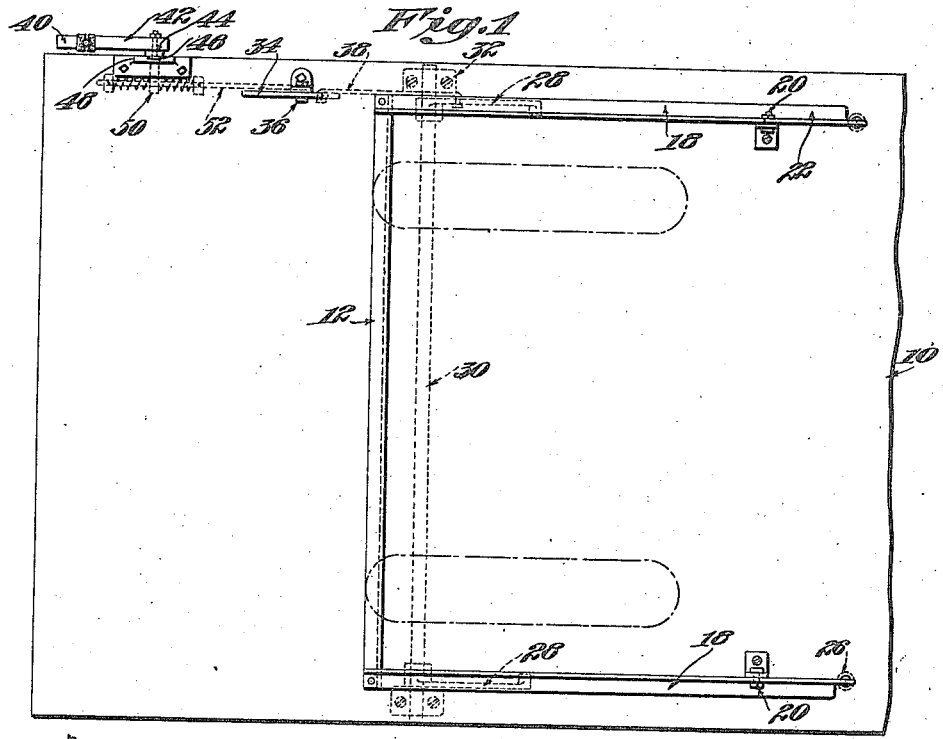
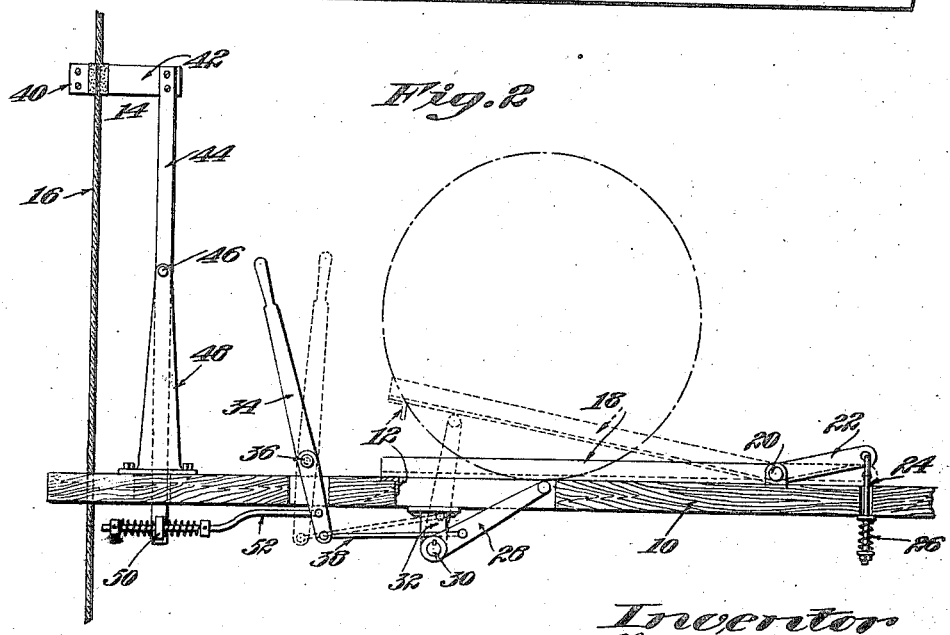

UNITED STATES PATENT OFFICE.

PHILIP L. SCHUYLER, OF SCITUATE, AND CLARENCE M. SNOW, OF BOSTON, MASSACHUSETTS, ASSIGNORS TO THE TRUSTEES OF THE MASSACHUSETTS AUTOMOBILE CLUB TRUST.

AUTOMOBILE ELEVATOR.

1,424,186.          Specification of Letters Patent.     Patented Aug. 1, 1922.

Application filed December 20, 1920. Serial No. 431,826.

*To all whom it may concern:*

Be it known that we, PHILIP L. SCHUYLER and CLARENCE M. SNOW, residing at Scituate, county of Plymouth, and Boston, county of Suffolk, Commonwealth of Massachusetts, respectively, have invented a certain Improvement in Automobile Elevators; and we do hereby declare the following to be a full, clear, and exact description of the invention such as will enable others skilled in the art to which it appertains to make and use the same.

The present invention relates to an improvement in automobile elevators. The object of the invention is to produce an improved form of elevator specially adapted for use as an automobile elevator by providing it with means to lock an automobile on it from being moved while the elevator is in motion.

To the above end the present invention consists in the automobile elevator hereinafter described and claimed.

Elevators used for transporting automobiles from floor to floor of buildings have sometimes been involved in accidents owing to the moving of the automobile while the elevator was in motion. The elevator of the present invention is provided with a contrivance to block the wheels of the car so that it cannot be moved except when the elevator is locked from motion.

In the accompanying drawing illustrating the preferred form of the invention, Fig. 1 is a plan of the elevator floor, and Fig. 2 is a sectional elevation of the same.

The illustrated embodiment of the invention is described as follows:

The floor 10 of the elevator, upon which the automobile is driven, is provided with a blocking device consisting of a bar 12, which, when the automobile is once in place, and the bar is raised above the level of the floor, prevents the automobile from rolling off the elevator. The mechanism for moving this bar from inoperative to operative position is connected with the elevator operating mechanism so that the elevator operating mechanism is locked at all times except when the wheels of the automobile are blocked. The contrivance, therefore, combines wheel blocking means with a locking device for the elevator operating mechanism.

The locking device indicated in a general way by the reference character 14 grasps and locks the elevator operating rope 16 when the blocking device 12 is depressed to permit the car to enter the elevator. Suitable connections between the locking devices for the elevator operating mechanism and the blocking device for the automobile wheels are provided to lock the wheels of the car and to unlock the elevator operating rope by one operation, and conversely to unlock the wheels and lock the operating devices by another operation. The details of construction are described as follows:

The blocking device 12 is an angle bar mounted on the ends of two levers 18 pivoted at 20 to the floor of an elevator having arms 22 extending beyond the pivots 20 for the purpose of affording a spring counter balance for the weight of the blocking bar 12 and the levers 18. A rod 24 pivoted in the end of the arm 22 extends down through a hole in the floor 10 and is there embraced by a spring 26 which normally tends to counterbalance the weight of the arms and blocking bar by pressing against the under side of the elevator floor. The blocking bar 12 is raised by two lifting arms 28 secured to the rock shaft 30 mounted in suitable supports 32 secured on the under side of the floor of the elevator. The ends of the arms 28 engage respectively the under sides of the levers 18. When they are turned from the full line position shown in Fig. 2 to the dotted line position they lift the levers 18 and thereby lift the blocking bar 12 as shown in Fig. 2. The operating lever 34 pivoted at 36 on the elevator floor is provided with a link 38 which connects the lower end of the operating lever 34 with the lifting arms 28. When the operating lever 34 is moved from the full line to the dotted line position of Fig. 2 the blocking bar will be lifted. When the lifting arms are in upright position they are held there by the friction between their ends and the lifting levers 18, which lifting arms press down upon the lifting levers and apply thereto their own weight, and in addition the weight of the blocking bar 12. The elevator rope 16 constitutes the elevator operating device, and the locking device for holding the operating device from operation consists of a stationary member 40 mounted on a part of the elevator and a movable member 42 which is mounted on the upper end of a lever 44 pivoted at 46 to the standard 48, which is bolted to the floor at one side of the elevator near the end and close to the elevator operating rope. The lower end of the locking lever 44 is provided with an ear 50 which has a hole in it through which the link 52 is adapted to slide. Two springs, one on each side of the ear 50, mounted on the link 52 as shown, constitute a flexible connection between the lock operating lever 44 and the link 52. The link 52 is connected at its other end to the operating lever 34. The arrangement is such that when the operating lever is moved to lift the blocking bar, the locking device is released, and when the operating lever is moved to drop the blocking bar, the locking device is operated to lock the elevator operating rope from operation.

When the elevator is brought to the floor to receive an automobile, the operating lever 34 is moved to the full line position, thus dropping the blocking bar and locking the elevator rope, holding the elevator from movement until the automobile has been driven onto the elevator. Then the operating lever is moved to dotted line position, thereby lifting the blocking bar so as to prevent the automobile from rolling off the elevator, and at the same time releasing the locking device of the elevator operating mechanism. The elevator operating mechanism, in this case the rope, may then be pulled upon to start the car, and again pulled upon to stop the car upon reaching the desired floor of the building, but then the automobile cannot be moved until the operating lever is moved from dotted to full line position (Fig. 2), dropping the blocking bar and locking the elevator operating means.

The present invention has been illustrated and described in connection with an elevator, but it is to be understood that it may be used with any sort of vehicle for transferring automobiles. In the vehicle shown in the drawing, the blocking device is shown at one end of the automobile carrying vehicle. Some elevators are open at one end and closed at the other. The car is driven on to the elevator and lifted or lowered to the floor at which it is to be discharged, and is removed from the elevator at the end where it entered. In such an elevator one blocking device is all that is necessary. Some elevators are double-ended, and an automobile is driven on, moved to another floor, and driven off the other end of the elevator. With such an elevator one of the blocking contrivances would be required at each end.

Having thus described the invention, what is claimed is:

1. An automobile carrier having a floor, a blocking bar arranged transversely of the path of the vehicle on to or off of the floor, a pair of levers secured to the floor and supporting the blocking bar, lifting levers pivoted to the floor, having ends which engage the blocking bar supporting levers, and a rock shaft on which said lifting levers are secured, operating when turned to lift the blocking bar into position to block the egress of the automobile from the carrier.

2. An automobile carrier provided with two levers pivotally mounted parallel to the path of the automobile on to the carrier, a blocking bar secured to the ends of the levers, a rock shaft pivotally mounted on the carrier and provided with two arms for engaging and lifting and holding lifted the blocking bar supporting levers.

PHILIP L. SCHUYLER,
CLARENCE M. SNOW.